US012580890B2

(12) United States Patent
Ezrielev et al.

(10) Patent No.: US 12,580,890 B2
(45) Date of Patent: Mar. 17, 2026

(54) PREVENTING THE INTRODUCTION OF MALICIOUS-EDGE-GATEWAY THE EDGE MANAGEMENT'S FLEET VIA NETWORK INTERCEPTOR AND IDENTITY VALIDATION

(71) Applicant: Dell Products L.P., Round Rock, TX (US)

(72) Inventors: Ofir Ezrielev, Be'er Sheba (IL); Yehiel Zohar, Sderot (IL); Yevgeni Gehtman, Modi'in (IL); Tomer Shachar, Beer-Sheva (IL); Maxim Balin, Gan-Yavne (IL)

(73) Assignee: Dell Products L.P., Round Rock, TX (US)

( * ) Notice: Subject to any disclaimer, the term of this patent is extended or adjusted under 35 U.S.C. 154(b) by 183 days.

(21) Appl. No.: 18/299,492

(22) Filed: Apr. 12, 2023

(65) Prior Publication Data

US 2024/0348583 A1 Oct. 17, 2024

(51) Int. Cl.
*H04L 9/40* (2022.01)
*H04L 12/66* (2006.01)
(52) U.S. Cl.
CPC .......... *H04L 63/0245* (2013.01); *H04L 12/66* (2013.01)
(58) Field of Classification Search
CPC ............................ H04L 12/66; H04L 63/0245
USPC .......................................................... 726/13
See application file for complete search history.

(56) References Cited

U.S. PATENT DOCUMENTS

| | | | | |
|---|---|---|---|---|
| 11,411,867 B1 * | 8/2022 | Kottapalli | ............... | H04L 45/24 |
| 2002/0188871 A1 * | 12/2002 | Noehring | ............ | H04L 63/0485 |
| | | | | 726/13 |
| 2014/0179360 A1 * | 6/2014 | Jackson | ............. | H04W 12/128 |
| | | | | 455/466 |
| 2016/0036861 A1 * | 2/2016 | Mattes | ............... | H04L 63/0272 |
| | | | | 726/1 |
| 2019/0073600 A1 * | 3/2019 | Boshev | .................. | G06N 5/046 |
| 2019/0230063 A1 * | 7/2019 | McCready | .............. | H04L 63/08 |
| 2020/0128114 A1 * | 4/2020 | Kloberdans | ............. | H04L 69/16 |
| 2020/0396783 A1 * | 12/2020 | Hwang | .................. | H04W 76/30 |
| 2021/0191826 A1 * | 6/2021 | Duraisingh | ......... | H04L 41/0893 |
| 2022/0129771 A1 * | 4/2022 | Horesh | ................. | G06F 18/213 |
| 2023/0239274 A1 * | 7/2023 | Wang | .................. | H04L 61/2592 |
| | | | | 726/15 |
| 2024/0028013 A1 * | 1/2024 | Toyota | .................... | H04L 12/66 |
| 2024/0163162 A1 * | 5/2024 | Gunturu | ................. | H04L 41/40 |

* cited by examiner

*Primary Examiner* — David P Zarka

(74) *Attorney, Agent, or Firm* — Workman Nydegger

(57) ABSTRACT

One method includes verifying, by a gateway management system, an edge gateway, upon successful verification of the edge gateway, generating an identifier that is unique to the edge gateway, and storing the identifier in the edge gateway. When the edge gateway intercepts a packet, the edge gateway may add the unique identifier to a header of the packet. When the gateway management system receives the packet with the modified header, the gateway management system can use the identifier as a basis to perform a validation process and then either drop the packet if the validation is unsuccessful, or execute the packet if the validation process is successful.

5 Claims, 4 Drawing Sheets

PREVENTING THE INTRODUCTION OF MALICIOUS-EDGE-GATEWAY THE EDGE MANAGEMENT'S FLEET VIA NETWORK INTERCEPTOR AND IDENTITY VALIDATION

FIELD OF THE INVENTION

Embodiments of the present invention generally relate to security in edge computing environments. More particularly, at least some embodiments of the invention relate to systems, hardware, software, computer-readable media, and methods, for preventing malicious actors from using a malicious gateway to gain access to systems, software, and data of an edge computing environment.

BACKGROUND

Edge gateways operating at a far-edge of a computing environment can be installed anywhere, geographically, where computation power is needed. However, deployment of the edge gateways in this way may expose the edge gateways to a new attack vector which has both logical, and physical, dimensions. Thus, edge gateways can no longer enjoy sophisticated, logical, and physical security controls, as are commonly employed in traditional data centers and, consequently, this significantly broadens the attack vectors which adversaries may be able to exploit.

For example, adversaries may exploit these weaknesses as an entry-point for malicious actors to the edge management system, where such exploitations may include, for example, ransomware, MITM (man in the middle) attacks, and data leakage. A MITM attack may involve, for example, a malicious entity that may divert, and/or relay to another malicious entity, legitimate traffic between two entities, and/or may involve the alteration of communication between two entities that believe they are directly communicating with each other.

One of the key risks that a modern edge gateway could be exposed to is physical access by a potential adversary. The adversary can use a clone of an edge gateway, or a system/device that mimics an edge gateway, to connect to the edge management system and start operating maliciously as a member of a fleet of edge gateways of the fleets, such as by encrypting hosted data on the other, legitimate, edge gateways and other systems and devices.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Figure 1:
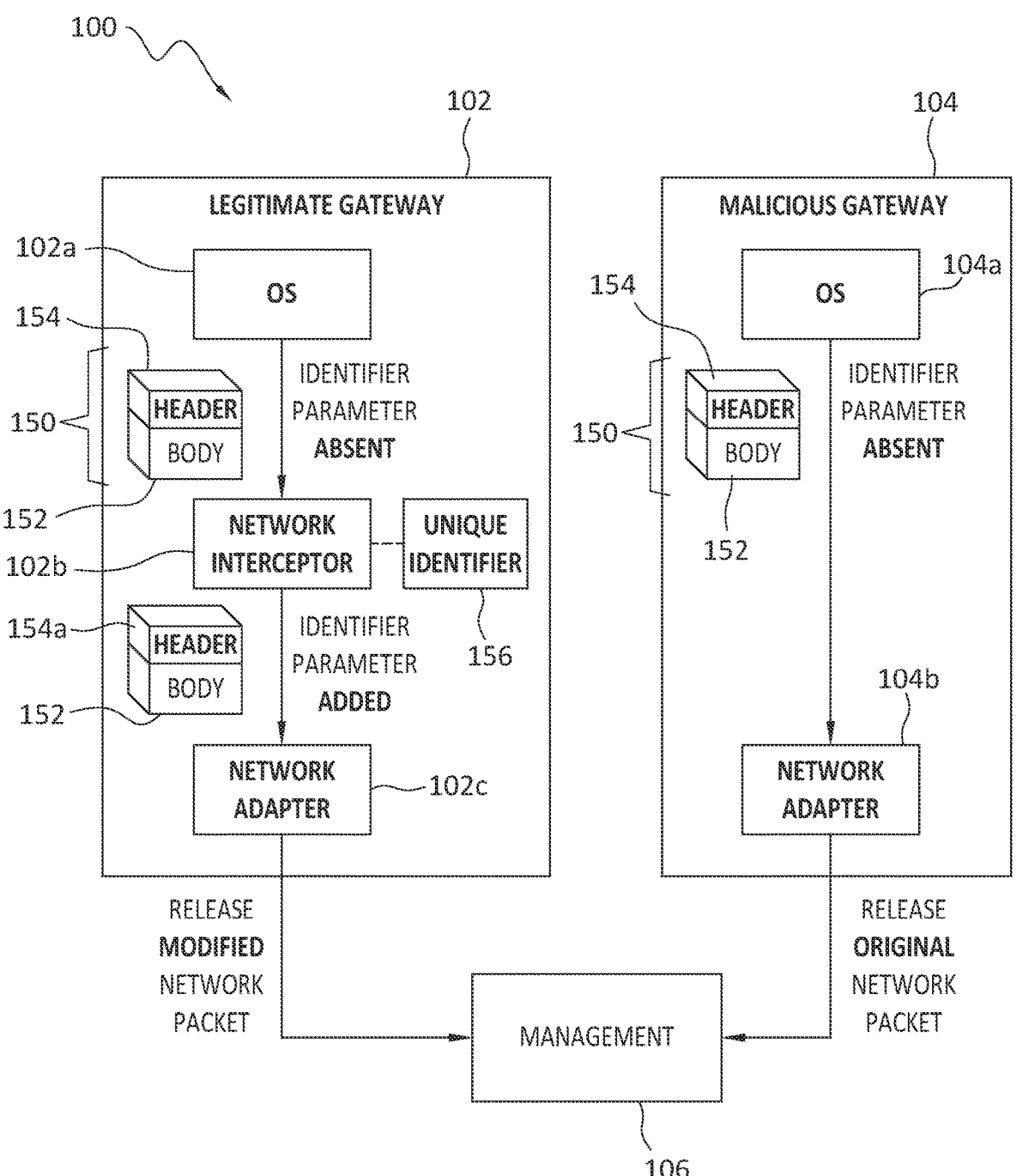
FIG. 1 discloses aspects of a gateway and associated operations and components, according to one embodiment.

Embodiments of the present invention generally relate to security in edge computing environments. More particularly, at least some embodiments of the invention relate to systems, hardware, software, computer-readable media, and methods, for preventing malicious actors from using a malicious gateway to gain access to systems, software, and data of an edge computing environment.

One embodiment may be implemented in an environment that includes multiple edge gateways that may communicate with, and be managed by, a near-edge system which may be referred to herein as 'edge management' or an 'edge management system.' Each of the edge gateways and the edge management system may comprise hardware and/or software. An embodiment may comprise an edge gateway installation and secured onboarding process in which the edge management system may verify the edge gateway as legitimate, and generate a unique identifier for the verified edge gateway. This unique identifier may be used by the edge management system to identify the edge gateway within the network traffic by adding the unique identifier to the header of packets sent by the edge gateway. When the edge management system receives network traffic, the edge management system may validate, and accept, only traffic sent by a validated edge gateway.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. For example, any element(s) of any embodiment may be combined with any element(s) of any other embodiment, to define still further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, one advantageous aspect of an embodiment of the invention is that devices such as edge gateways may be validated in a way that imposes little or no burden on communications in the system where the edge gateways are located. An embodiment may readily distinguish between legitimate, and malicious, gateways in a computing environment, and manage traffic in the computing environment accordingly. Various other advantages of one or more embodiments of the invention will be apparent from this disclosure.

It is noted that embodiments of the invention, whether claimed or not, cannot be performed, practically or otherwise, in the mind of a human. Accordingly, nothing herein should be construed as teaching or suggesting that any aspect of any embodiment of the invention could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods processes, and operations, are defined as being computer-implemented.

A. Overview of Aspects of an Example Embodiment

One embodiment of the invention concerns an edge identity mechanism which may allow network traffic integrity validation of traffic that an edge gateway sends to an edge management system. This embodiment may remediate the risk of spoofing traffic, and the connection of malicious edge gateways to a fleet or other grouping of edge gateways. An embodiment may modify each network packet structure to enable implantation of a unique edge gateway identifier without influencing performance of the edge gateway. Since the unique identifier may be sent by the edge gateway as part of the network packets, this approach may not require an additional handshake, or validation, for each packet.

In more detail, during an edge gateway installation and secured onboarding process, the edge management system may verify the edge gateway and generate, using a single-valued function for example, a unique identifier for the edge gateway. This unique identifier may be used by the edge management system to identify the edge gateway within the network traffic by adding the unique identifier to the header of the packets transmitted by that edge gateway.

When the edge management system receives network traffic, the edge management system may validate, and accept, only network traffic sent by an edge gateway whose identity has been validated. That is, if a packet header includes a unique identifier of a legitimate edge gateway, traffic from that edge gateway may be accepted. If a packet header does not include a unique identifier, or includes an identifier of an unauthorized edge gateway, traffic from the edge gateway that sent that traffic will not be accepted by the edge management system.

To make the process of implanting digest value in the packets seamless, an embodiment may implement that process by way of an internal-kernel-based-network-connector, that will be responsible for that task. Consistent with security best practices, the security digest that includes the list of unique identifiers may be regenerated from time to time, and respective new unique identifiers assigned to the authorized edge gateways.

B. Aspects of An Example Architecture and Environment for An Edge Gateway

With attention now to FIG. 1, there are disclosed various aspects of an edge gateway and associated operations and components, according to one embodiment. In the environment 100 of FIG. 1, there is an example 'legitimate' edge gateway 102, and an example 'malicious' edge gateway 104, both of which may communicate, or attempt to, with an edge management system 106. Such communications may comprise, for example, network packets. Note that an 'edge gateway' may also be referred to herein simply as a 'gateway.'

The edge gateway 102 may comprise an OS (operating system) 102a which, in one embodiment, may comprise a Linux operating system (OS) that includes a kernel that serves as an interface between the edge gateway 102 hardware and associated processes. The OS 102a may receive network traffic, such as one or more packets 150 that each comprise a body 152, or payload, and a header 154. As shown, the packet 150 may, initially, lack an identifier parameter, or identifier. Thus, in an embodiment, the packet 150 may be intercepted by a network interceptor 102b of the edge gateway 102. The network interceptor 102b may add a unique identifier 156 to the packet 150. The unique identifier 156 may be unique to the edge gateway 102, and may be added to each packet 150 handled by the edge gateway 102. In an embodiment, the unique identifier 156 may be added to the header 154 to define a modified header 154a that is associated with the body 152. The modified packet, that is, modified to include the unique identifier 156, may then be passed to a network adapter 102c of the edge gateway 102 for transmission to the gateway management system 106.

The gateway management system 106 may check the unique identifier and if it is from an authorized gateway, the modified packet 150 may be passed along by the gateway management system 106. An example onboarding process for an edge gateway is disclosed elsewhere herein.

By way of contrast with the edge gateway 102 according to one embodiment of the invention, a malicious edge gateway 104 may lack the components and capability to apply a gateway-unique identifier to packets 150 being handled by the edge gateway 104. In particular, the edge gateway 104 may comprise an OS 104a that receives a packet 150 and then passes the packet 150, without any modification to the packet 150, to a network adapter 104b. Thus, when the gateway management system 106 receives the packet 150 from the edge gateway 104, the gateway management system 106 is able to readily determine, by inspection of the header 154, that no gateway-unique identifier is present and, thus, network traffic from the edge gateway 104 may be refused by the gateway management system 106.

C. Aspects of an Example Onboarding Procedure for a Gateway

Figure 2:
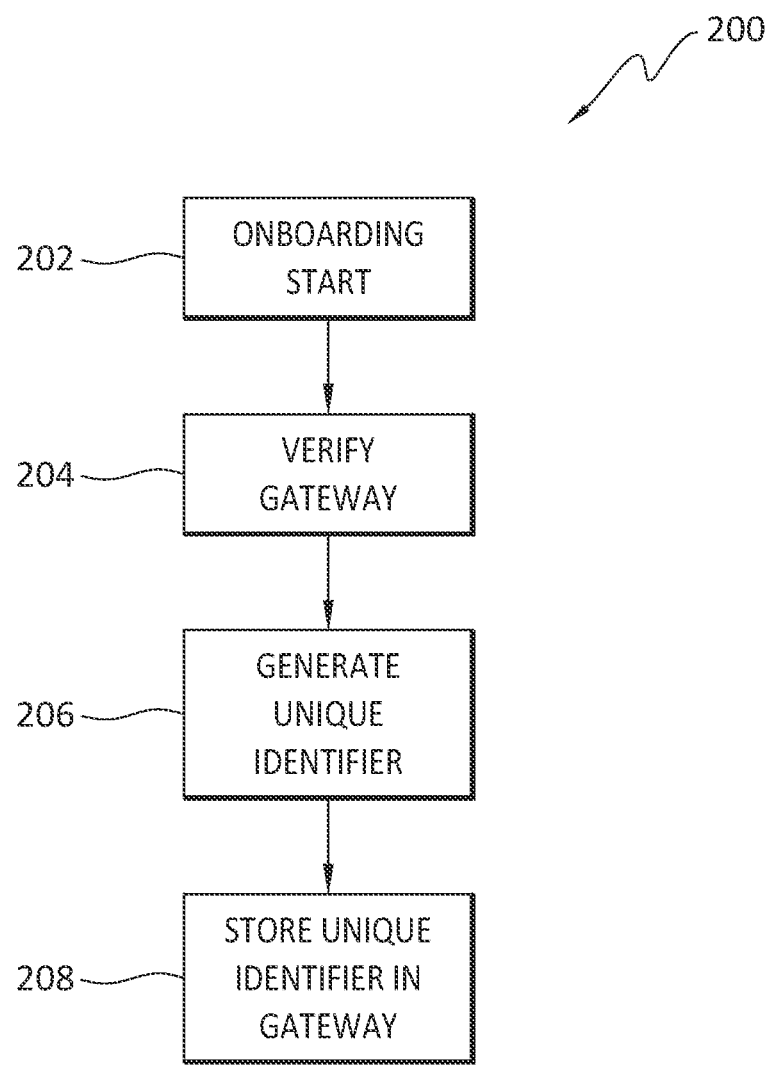
FIG. 2 discloses aspects of an example onboarding procedure for a legitimate gateway, according to one embodiment.

An embodiment of the invention may employ unique identifiers to determine if network traffic should be accepted or not from a gateway. FIG. 2 discloses an example method 200 for the secure installation and onboarding of a gateway into an environment such as an edge computing environment, for example. The method 200, which may be performed by a gateway management system for example, may be initiated, when the gateway management system receives network traffic that includes a gateway-unique identifier. Note that even though traffic may include a gateway-unique identifier, the traffic may still have to be validated, since a gateway may be a legitimate device, but is nonetheless not authorized to join the environment for some reason. On the other hand, traffic that does not include any identifiers, may be rejected automatically by the gateway management system without any further inspections or analyses.

As shown in FIG. 2, the method 200 may be initiated 202 when a new gateway is to be installed and onboarded. In an embodiment, the initiation 202 may take place automatically in response to receipt of traffic from an unknown gateway. Alternatively, the initiation 202 may take place with a new gateway from which no traffic has yet been received.

Next, a verification process 204 may be performed to verify that the gateway has been authorized to join the environment. For example, a database may be consulted to determine if the gateway is listed in a list of authorized gateways and if the gateway is listed, such as by name or IP address for example, then the gateway may be verified 204. If the gateway is not listed in the database, the onboarding process may fail.

Once the gateway has been verified 204, a unique identifier may be generated 206 for that gateway. The unique identifier, that is, unique to the gateway, has been generated 206, the unique identifier may then be stored 208 in the gateway. The newly onboarded gateway may then add the unique identifier to any network traffic that the gateway generates, as discussed above with respect to the example gateway 102 of FIG. 1.

D. Example Communication Integrity Check for a Gateway

Figure 3:
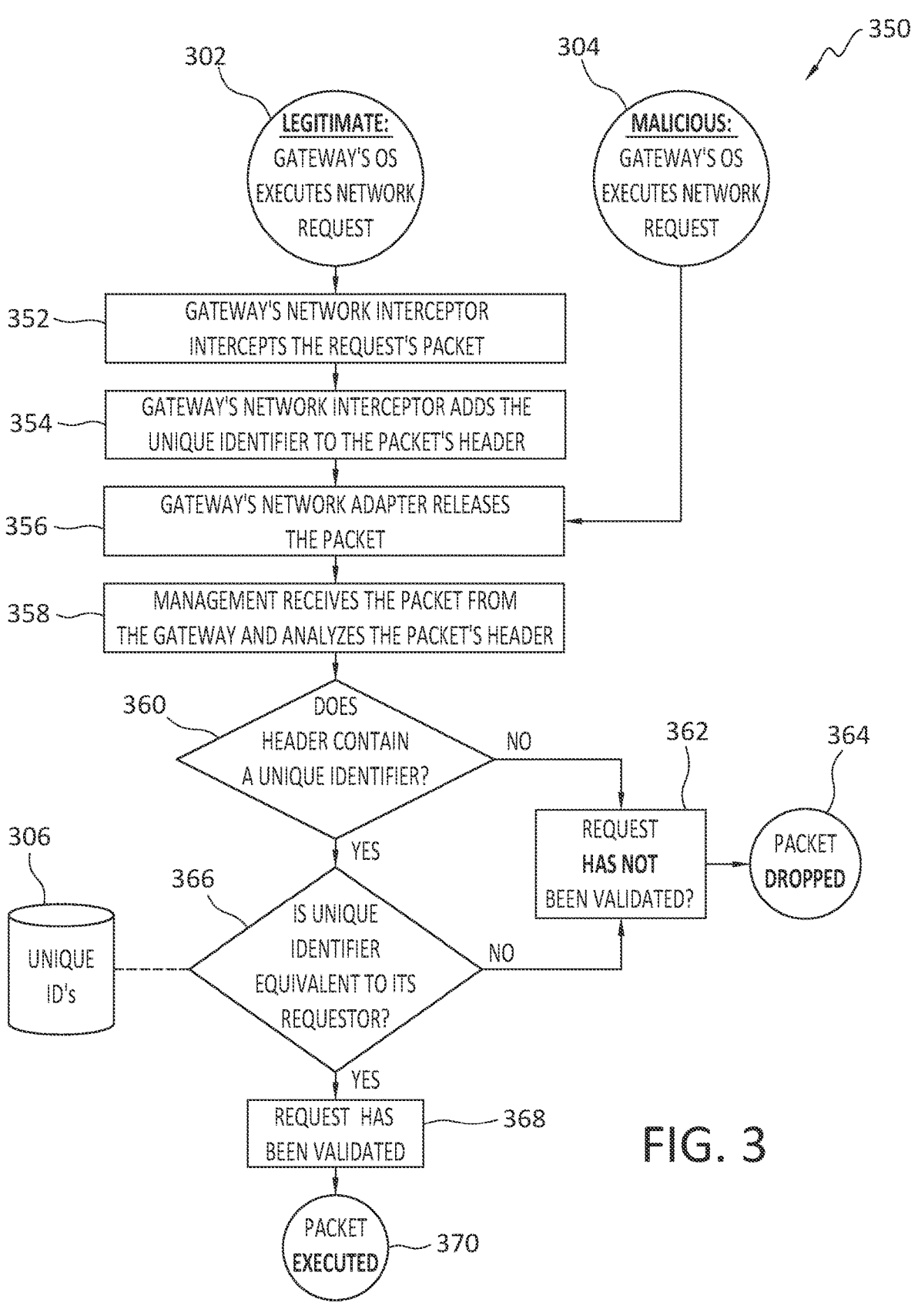
FIG. 3 discloses an example procedure for a communication integrity check for a gateway, according to one embodiment.

With attention now to the example of FIG. 3, both a legitimate gateway 302 and a malicious gateway 304 may be operating in an environment, such as an edge computing environment for example, and the respective OSs of the gateways 302 and 304 may be executing various network requests. A method 350 according to one embodiment may comprise a communication integrity check for a gateway.

The example method 350 may begin when a network interceptor of the gateway 302 intercepts 352 a packet from a requestor, that is, an originator of a network request. The gateway 302 may then add 354 the unique identifier of the gateway 302 to the packet header. After the unique identifier has been added 354 to the packet header, the gateway may then release 356 the packet with the modified header. Likewise, the malicious gateway 304 may release a packet that includes an unmodified header, that is, a header that lacks a unique identifier.

The packets from both the gateways 302 and 304 may be received 358 by a gateway management system that may be configured and operable to perform packet header inspections. Thus, at 360, a check may be performed to determine if a packet header contains a unique identifier. In the case of a packet received from the gateway 304, the packet header for that packet would not include a unique identifier and, as such, the network request executed by the gateway 304 fails validation 362, and the packet is then dropped 364.

If it is determined 360 that the packet header contains a unique identifier, the method 350 may advance to 366 where another check is performed, this time to determine if the unique identifier matches up with the gateway, that is, the entity executing the network request, from which the packet was received. The check 366 may comprise consulting a database 306 of unique identifiers to determine if there is a match between the unique identifier found in the packet header and the requesting gateway from which the packet was received.

If it is determined 366 that there is no such match, the method 350 may return to 362. On the other hand, if it is determined 366 that the unique identifier matches up with the requesting gateway from which the packet containing the unique identifier was received, then the network request from the gateway, 304 in this example, is validated 368, and the packet executed 370.

E. Aspects of the Example Methods

It is noted with respect to the disclosed methods, including the example methods of FIGS. 1-3, that any operation(s) of any of these methods, may be performed in response to, as a result of, and/or, based upon, the performance of any preceding operation(s). Correspondingly, performance of one or more operations, for example, may be a predicate or trigger to subsequent performance of one or more additional operations. Thus, for example, the various operations that may make up a method may be linked together or otherwise associated with each other by way of relations such as the examples just noted. Finally, and while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited.

F. Further Example Embodiments

Following are some further example embodiments of the invention. These are presented only by way of example and are not intended to limit the scope of the invention in any way.

Embodiment 1. A method, comprising: verifying, by a gateway management system, an edge gateway; upon successful verification of the edge gateway, generating an identifier that is unique to the edge gateway; and storing the identifier in the edge gateway, wherein the identifier is usable by a network interceptor of the edge gateway to mark network traffic associated with the edge gateway.

Embodiment 2. The method as recited in any preceding embodiment, wherein in operation, a network interceptor of the edge gateway modifies one or more packet headers to include the identifier.

Embodiment 3. The method as recited in any preceding embodiment, wherein when the gateway management system receives a packet including a packet header without the unique identifier, the packet is dropped by the gateway management system.

Embodiment 4. The method as recited in any preceding embodiment, further comprising receiving, by the gateway management system from the edge gateway, a packet that includes a header with the unique identifier.

Embodiment 5. The method as recited in embodiment 4, wherein the gateway management system checks the packet header to determine if the unique identifier is present in the packet header.

Embodiment 6. The method as recited in embodiment 5, wherein when the unique identifier is determined to be present in the packet header, the gateway management system checks to determine if there is a match between the edge gateway and the unique identifier.

Embodiment 7. The method as recited in embodiment 6, wherein when there is a match between the edge gateway and the unique identifier, the gateway management system validates a network request with which the packet is associated, and then executes the packet.

Embodiment 8. The method as recited in embodiment 6, wherein when there is not a match between the edge gateway and the unique identifier, the gateway management system drops the packet.

Embodiment 9. The method as recited in any preceding embodiment, wherein the unique identifier is generated using a one-way function.

Embodiment 10. A system, comprising hardware and/or software, operable to perform any of the operations, methods, or processes, or any portion of any of these, disclosed herein.

Embodiment 11. A non-transitory storage medium having stored therein instructions that are executable by one or more hardware processors to perform operations comprising the operations of any one or more of embodiments 1-9.

G. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 4:
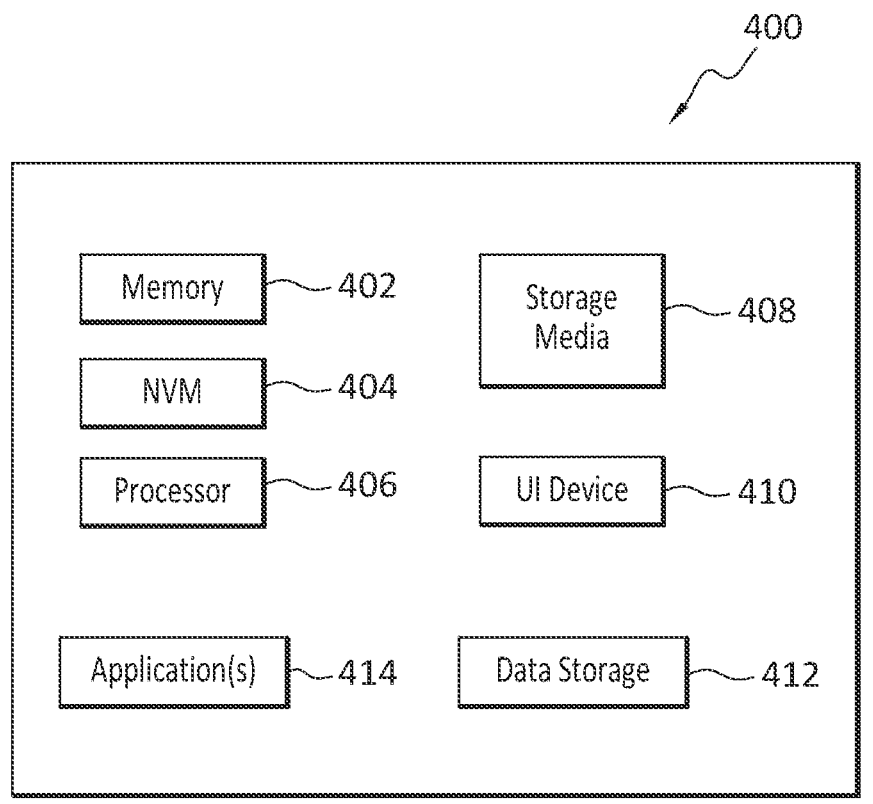
FIG. 4 discloses an example computing entity configured and operable to perform any of the disclosed methods, processes, and operations.

With reference briefly now to FIG. 4, any one or more of the entities disclosed, or implied, by FIGS. 1-3, and/or elsewhere herein, may take the form of, or include, or be implemented on, or hosted by, a physical computing device, one example of which is denoted at 400. As well, where any of the aforementioned elements comprise or consist of a virtual machine (VM), that VM may constitute a virtualization of any combination of the physical components disclosed in FIG. 4.

In the example of FIG. 4, the physical computing device 400 includes a memory 402 which may include one, some, or all, of random access memory (RAM), non-volatile memory (NVM) 404 such as NVRAM for example, read-only memory (ROM), and persistent memory, one or more hardware processors 406, non-transitory storage media 408, UI device 410, and data storage 412. One or more of the memory components 402 of the physical computing device 400 may take the form of solid state device (SSD) storage. As well, one or more applications 414 may be provided that comprise instructions executable by one or more hardware processors 406 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A non-transitory storage medium having stored therein instructions that are executable by one or more hardware processors to perform operations comprising:

verifying, by a gateway management system, an edge gateway;

upon successful verification of the edge gateway, generating an identifier that is unique to the edge gateway;

storing the identifier in the edge gateway, wherein the identifier is usable by a network interceptor of the edge gateway to mark network traffic associated with the edge gateway;

receiving, by the gateway management system from the edge gateway, a packet that includes a packet header with the unique identifier, and the gateway management system checks the packet header to determine if the unique identifier is present in the packet header and when the unique identifier is determined to be present in the packet header, the gateway management system checks to determine if there is a match between the edge gateway and the unique identifier, and when there is a match between the edge gateway and the unique identifier, the gateway management system validates a network request with which the packet is associated, and then executes the packet.

2. The non-transitory storage medium as recited in claim 1, wherein in operation of the network interceptor, the network interceptor of the edge gateway modifies one or more packet headers to include the identifier.

3. The non-transitory storage medium as recited in claim 1, wherein when the gateway management system receives a second packet including a second packet header without the unique identifier, the second packet having the second packet header without the unique identifier is dropped by the gateway management system.

4. The non-transitory storage medium as recited in claim 1, wherein when there is not a match between the edge gateway and the unique identifier, the gateway management system drops the packet.

5. The non-transitory storage medium as recited in claim 1, wherein the unique identifier is generated using a one-way function.

* * * * *